United States Patent [19]

Mäkipirtti et al.

[11] 4,304,596
[45] Dec. 8, 1981

[54] PROCESS FOR A SULFIDIZING PRETREATMENT OF THE SLAG OF PYROMETALLURGICAL PROCESSES IN ORDER TO FACILITATE ITS FURTHER TREATMENT

[75] Inventors: Simo A. I. Mäkipirtti, Nakkila; Frans H. Tuovinen, Ulvila, both of Finland

[73] Assignee: Outokumpu Oy, Outokumpu, Finland

[21] Appl. No.: 178,545

[22] Filed: Aug. 15, 1980

[30] Foreign Application Priority Data

Aug. 22, 1979 [FI] Finland ............................... 792622

[51] Int. Cl.$^3$ .............................................. C22B 7/04
[52] U.S. Cl. ...................................................... 75/24
[58] Field of Search ............................................ 75/24

[56] References Cited

U.S. PATENT DOCUMENTS

3,751,243  8/1973  McLeod ................................. 75/24

Primary Examiner—M. J. Andrews
Attorney, Agent, or Firm—Brooks, Haidt, Haffner & Delahunty

[57] ABSTRACT

Sulfidizing pre-treatment of slag from pyrometallurgical processes in order to facilitate its further treatment, by stacking solid sulfur-bearing reductant and molten slag in alternate layers, the temperature of the molten slag being so low that crystals are formed upon the addition of the reductant, or soon after the addition of the reductant, but at the same time so high that it suffices for melting the reductant between the slag layers; and by allowing the slag to cool.

5 Claims, 4 Drawing Figures

FeO – Fe$_2$O$_3$ – SiO$_2$ – FeS

| "P" | -log P, atm | | °C | p – % | | |
|---|---|---|---|---|---|---|
| | O$_2$ | S$_2$ | T | FeS | FeO$_{1.5}$ | SiO$_2$ |
| E | 9 | – | 1140 | – | 11,2 | 34,2 |
| I | 9,5 | – | 1095 | 10,0 | 14,5 | 29,0 |
| L | 9,5 | – | 1095 | 57,0 | 10,4 | 2,0 |
| N | 12 | 5 | 955 | 63,0 | 11,0 | 1,0 |
| O | 14,5 | 4 | 1075 | 85,0 | 0,3 | 0,5 |
| D | 9,9 | – | 1150 | – | 14,2 | 22,0 |
| Q | 14 | 6 | 945 | 62,0 | 10,3 | 1,0 |
| F | <12 | – | 1178 | – | 1,7 | 37,8 |
| J | 13,5 | – | 1140 | 16,0 | 0,7 | 26,0 |
| K | 13,5 | – | 1140 | 83,0 | 0,3 | 1,5 |
| C | <12 | – | 1177 | – | 3,7 | 23,4 |
| R | 15 | 7 | 917 | 62,0 | 0,7 | 1,0 |

PROCESS FOR A SULFIDIZING PRETREATMENT OF THE SLAG OF PYROMETALLURGICAL PROCESSES IN ORDER TO FACILITATE ITS FURTHER TREATMENT

BACKGROUND OF THE INVENTION

The present invention relates to a process for sulfidizing pretreatment of the slag of pyrometallurgical processes, in particular olivine slags and other silicate slags, in order to facilitate the recovery of their valuable metal content during the further treatment stages, especially in froth flotation of slag.

The losses due to the passing of valuable metals, Cu, Ni, Co, Sn, Pb, etc., into slag phases during the smelting of ores and concentrates can be divided into two main categories, i.e. electrochemical and mechanical losses. Electrochemical losses are caused by the physical or chemical solubility, in slag phases, of sulfides and/or oxides which contain valuable metals. Mechanical losses, for their part, are due to the residue of finely-divided metallic and sulfidic drops in the slag phase, resulting either from the slow settling due to high slag viscosity or from adsorption phenomena, or from both of these together. The proportion of the mechanical losses to the total losses is a function of the smelting conditions, the slag phase compositions and the type of the valuable metals. For example, in shaft furnace smelting, percent loss/metal: 60-85/Cu, 97-99/Ni, ~50/CO, 50-70/Pb. The electrochemical losses can usually be decreased to very low values by regulating the compositions of the slag phases and the oxygen and sulfur potentials of the slags. Decreasing the mechanical losses, on the other hand, is often a very difficult technical problem.

A very great number of different methods have been developed for the recovery of the valuable metals present in smelting plant slags and for decreasing the losses. In this context, primarily those processes linked to a simultaneous reduction and sulfidization of the slag phases are discussed; these processes as such have features in common with the process according to the invention.

The removal of valuable metals from slag phases by means of an addition of sulfide is based on the simultaneous decreasing of both electrochemical and mechanical losses. In this case the objective is that - by means of the addition of sulfide (alone or together with, for example, coke) the oxygen potential of the slag phase is lowered and its sulfur potential is raised, whereby the oxide compounds of the valuable metals are metallized and/or sulfidized. The valuable metals and their compounds dissolve in the excess sulfide phase, which, furthermore, extracts a large quantity of ferric iron in oxide form from the slag melt.

the addition of a common ion to the slag phase lowers its sulfide solubility and, furthermore, the higher solubility of the valuable-metal sulfides in the increased sulfide phase than in the slag phase decreases the losses.

the small metal and matte drops mechanically present in the slag melt combine, forming sufficiently large drops under the effect of the drops of added sulfide, impinging against them.

The sulfide mattes obtained from the sulfide reduction and extraction of slags usually have a low content of valuable metals. Conventionally, sulfide extraction is already linked to the actual smelting. In this case, only low-grade sulfide mattes are produced in the basic smelting apparatus, and the slag melts high in valuable metals, produced during the conversion of these mattes, are returned to the basic smelting unit (e.g. reverberatory furnace: The Physical Chemistry of Copper Smelting, Inst. Min. Met., 1953, London, 11-18, 64-84; Trans. AIME, 1966, 821).

When sulfide mattes high in valuable metals are produced, slag phases with a high oxygen potential and at the same time with a high concentration of oxidic valuable metals are produced. In this case the extraction of the slag by means of a sulfide addition is carried out by discharging, before the extraction, the matte high in valuable metals from the smelting apparatus. In addition to iron sulfide, concentrates low in valuable metals are also used in this case as extracting sulfides (U.S. Pat. No. 2,668,107). By suitable technological means the sulfide extraction can also be arranged to be carried out in connection with the actual production of high-grade matte or metal; however, in this case the slag-extraction part of the process constitutes a zone which produces low-grade matte (U.S. Pat. Nos. 3,460,817, 3,674,463, 3,687,656).

The slag phase obtained in connection with the basic smelting of valuable metals can also be extracted and reduced in a separate converter or electric furnace apparatus. In this case, an effective mixing of the slag melt with the extraction melt, necessary for the process, is essential (U.S. Pat. Nos. 3,506,435, 3,857,700).

The low-grade sulfide mattes produced as products constitute a disadvantage in the processes for extracting molten slag phases. Multi-stage, and therefore expensive, countercurrent extraction apparatus (light-arc furnaces in a series) are necessary for the production of high-grade sulfide mattes. It must be noted that the reduction and sulfidization, as well as the settling of the obtained product sulfide, are time-consuming, and, consequently, high amounts of energy are required for compensating the heat required by the endothermal reactions and the heat losses from the apparatus.

In order to produce the sulfide matte which is a product of extraction carried out at a high temperature, and in order to reach a high equilibrium sulfide solubility of the waste slag, high amounts of sulfide must be used in the extraction processes, which is uneconomical. The slag phases from the production of high-grade sulfide mattes, e.g. 50-60% by weight Cu, still containing a large quantity of iron sulfide, and related converter slags, can be reduced by adding coke, lime and sulfides, to produce, in an electric furnace, a valuable-metal matte of a higher grade than a conventional one. In this case the degree of reduction of the system must already approach the degree of oxidation corresponding to metallic iron (U.N. Seminar on Copper Production, Tashkent, 1970 October; Pyrometallurgical Processes in Nonferrous Metallurgy, Gordon & Breach, 1967, 175).

The various types of froth-flotation processes for slag phases constitute an important group of processes for the recovery of valuable metals from smelting-plant slags. The converter slags which are produced in series conversion of low-grade sulfide mattes obtained from reverberatory smelting and have an advantageous sulfur level are highly suitable for froth flotation, in which case the slag return, which is usually adverse to the basic process, is also eliminated. In addition to the leaching of slag, the flotation methods can also be applied to the slag phases produced in the production of mattes high in valuable metals, provided that the sulfur content in these slags is primarily sufficient (J. Metals, p. 22, 1969, 30; World Mining, 1971, 32–37; Mineral Industries Bull. II, 1968, 1–18). In this case, the slag phase must be cooled slowly in order that its crystallization (and at least partial, diffusive particle growth of the sulfide phase) should take place, thereby improving its grindability. It should be pointed out as one way of applying froth flotation methods that rapidly cooled, coarse-crushed converter slag can be used as grinding pieces in, for example, the milling of copper ores. In this case, when the ore is concentrated by flotation, the valuable-metal contents of converter slags are also recovered, with a high yield ($>80\%$) (Soviet J. Non-Ferrous Metals 7, 1966, 11).

The process according to the present invention primarily comprises a technical-economic improvement relating to the recovery of the valuable metals present in the process slag phases of copper and nickel smelting plants. The process relates to the pyrometallurgical reduction of the slag phase, to the sulfidization of its valuable-metal content, and to the improvement of its grindability when using froth flotation methods.

SUMMARY OF THE INVENTION

According to the present invention there is provided a process for sulfidizing pre-treatment of the slag of pyrometallurgical processes by stacking the solid sulfur-bearing reductant and the molten slag in alternate layers, the temperature of the molten slag being so low that crystals are formed upon or soon after contact with the reductant, and at the same time so high that it suffices for melting the reductant between the slag layers; and then allowing the slag to cool.

DESCRIPTION OF THE PREFERRED EMBODIMENTS

According to the process, slags discharged from the smelting unit are treated with a suitable sulfide at a decreasing temperature by adding the solid sulfide, possibly together with an additional, fossil reducing agent by, for example, suspension injection as thin layers directly between layers of slag melt, cast directly on the ground or in chills. The addition of the sulfidizing agent is carried out at a temperature at which the primary crystallization of the slag phase has just started or is just starting. At the time of the formation of the primary crystallization, the oxygen pressure in the slag phase has decreased from the original processing value to such a value that the sulfide to be added dissolves in the residual melt. Owing to the formation of the primary crystallization and to the simultaneous decrease in temperature, the viscosity of the melt increases and prevents a rapid settling of the sulfide added. The sulfidizing agent (pyritepyrrhotite mixtures, earth-alkali sulfates and coke), as well as the gas phase ($S_2$, $CO$, $CS_2$, $COS$, etc.) dissociating from it, rapidly reduces and/or sulfidizes the valuable-metal oxides which have dissolved in the residual melt, as well as part of the ferric iron. The formed product gas phase ($S_2$, $SO_2$, $CO$, $CO_2$) breaks down the slag-layer boundary areas within the area of the primary crystallization to a porous or compartmental cell structure, whereby the grinding process after the cooling of the slag phase is substantially facilitated. The joining of the reduced metal and/or sulfide drops of the slag phase into flotatable large drops is achieved by utilizing the low viscosity of the formed valuable-metal sulfide, as well as the nearly complete wetting of the valuable-metal sulfide and the primary segregations of the slag. In this case, the melt drops accumulate together, along uninterrupted sulfide bridges consisting of the crystallization surfaces, and thus the relatively high sulfide melt-gas phase surface energy produces a sufficiently high drop size when the free energy of the system decreases. The segregation of the sulfides from the solidifying silicate matrix (fayalite slags) is achieved by utilizing the solubility gap of the system $FeO$—$FeO_{1.5}$—$FeS$—$SiO_2$, whereby the sulfide conjugate solution which contains a large part of the valuable-metal sulfides, segregates from the silicate conjugate solution. The utilization of the melt solubility gap is implemented by regulating the quantity of the sulfide addition, by controlling the oxygen pressure, and by controlling the primary composition of the slag phase in such a manner that the solubility gap can be opened.

The process according to the invention is highly suitable for the production of high-grade sulfide mattes or valuable metals, when the sulfur content in the equilibrium slag phases is insufficient (and the oxygen potential is high) for the application of conventional cooling and froth flotation methods. The process does not require additional energy. A slow solid-state diffusion cooling after the crystallization of the silicates need not be carried out in the process.

The object of the present invention is thus to simplify the reduction and sulfidization of the valuable metals present in metallurgical slag phases. In connection with the reduction and sulfidization, the structure of the slag phases is simultaneously changed so as to improve substantially their crushability and grindability.

The present process is suitable for use in connection with conventional froth flotation or other physical separation processes for valuable metals and their compounds. The present invention is especially suitable in the treatment of the slag phases, high in valuable metals and low in sulfur, obtained in connection with the production of metals or sulfide mattes high in valuable metals.

According to the invention, the molten slag phase may be sulfidized and reduced by casting the slag in layers either on the ground or in chills. During the casting, a thin layer of a solid sulfidizing agent is fed between the slag layers by suspension injection or by some other suitable technique. Thus the sulfidizing agent, having a large surface area, is enclosed between layers of the melt phase, a factor which is very important for the reduction reactions and for the autogenic mixing of the segregating reduction gases and the melt phase. The sulfidizing agent used can be made up of conventional sulfides, i.e. pyrite, pyrrhotite, calcium sulfide, etc., depending on the composition of the slag.

The temperature of the slag is preferably 1150°–1250° C. in the treatment of fayalite slag and 1350°–1500° C. in the treatment of slags which contain earth-alkali silicate and aluminium oxide.

The process according to the invention is based on the following observations of the phenomena occurring between reducing and sulfidizing agents and slag phases:

The sulfidizing agent, e.g. pyrite, which has come between the melt phases (here different fayalite slag compositions) warms up rapidly, the slag phase respectively cooling. The sulfidizing agent dissociates as regards the excess sulfur ($FeS_2 \rightarrow FeS + S_n$) and finally melts.

Owing to the different heat transfer coefficients of the sulfide and of the silicate phase, the melt phase supercools sharply around the sulfide phase.

The supercooling of the slag melt causes, substantial nucleating being prevented, primary crystal segregations to grow as gigantic crystals directed towards the slag melt. The rate of crystal growth reaches its maximum value under these conditions, since the heat amount released during the separation of the crystallization is quantitatively absorbed in the supercooled slag melt, and thus overheating, which would slow down the growth of the primary segregation, cannot occur.

The pressure and temperature of the gas phase, mainly consisting of elemental sulfur, obtained from the dissociation of the sulfidizing agent, increase to high values at the phase boundary, owing to the increased viscosity of the system as a result of the supercooling of the melt phase and the primary segregation. Under the effect of the produced pressure, the melt phases (sulfide + silicate) squirt from the compartmental cell structure of the primary crystallization.

The dissociation gas phase rises at the original phase boundary, becomes mixed with the slag melt and causes, for its part, the reduction of the valuable-metal oxides and ferric iron present in the melt phase.

The dissociated sulfide phase melts and settles downwards as an even zone and, owing to the high viscosity of the melt phase, this occurs slowly. Part of the sulfide reduces and sulfidizes valuable metals by conversion reactions. Both the conversion sulfides and part of the original sulfide dissolve in the slag melt. The slow settling of the sulfidizing medium provides sufficient retention time for both the conversion and the dissolving reactions.

Owing to the segregation of the fayalite, tridymite and magnetite crystals, sulfur concentrates in the melt solution until a solubility gap belonging to the system $FeO - FeO_{1.5} - SiO_2 - FeS$ ($Cu_2S$, $Ni_3S_2$, $Co_4S_3$, $ZnS$, $PbS$, etc.) is (here) reached. Under the effect of this solubility gap, the conjugate phases forming from the low-sulfur slicate melt and from the high-sulfur, low-silicic-acid sulfide melt separate out as separate phases.

The separating sulfide melt wets almost completely the crystal surfaces of the primary and principal silicate segregations, whereby it is capable, under the effect of its suitable surface energy and low viscosity, to accumulate into large drops via the formed "melt bridges". The formation of a conventional, finely-divided "cloud of valuable metals and sulfides" is avoided.

When all of the silicate conjugate melt has been consumed by crystallization, the slow cooling of the system is no longer necessary. Since the sulfide phase, which contains the bulk of the valuable metals, is already in the system in a particle size sufficiently large for further treatment, the conventional low-temperature diffusion transfer of material for the segregation of the valuable-metal sulfides is not necessary.

Carrying out the process according to the present invention with the atmosphere-sensitive slag melts of the system $FeO - FeO_{1.5} - FeS - SiO_2$ results in an intermediate form of a constant-pressure and constant-composition crystallization. Part of the oxygen released during the constant-pressure crystallization is received by elemental sulfur or by the fossil fuel fed together with the sulfidizing medium, and therefore the oxygen potential in the system is not changed in the proportion presupposed by constant-composition crystallization. Thus, with slag melts within the fayalite range, crystallization can be regulated by means of the quality and quantity of the sulfidic addition, the concentration of silicic acid in the melt, and the casting temperature. The present process is also suitable for low-iron slag melts of the system $CaO - MgO - Al_2O_3 - SiO_2$, which are not sensitive to the atmosphere. Also in these slag melts, an effective reduction and sulfidization of the valuable-metal oxides can be achieved by means of an addition of sulfide. The product slag phase obtained is also mechanically weak, but the compartmental cell structure characteristic of fayalite slags has been replaced by fine pore conduits extending through the slag matrix.

In the process according to the invention, large quantities of sulfidizing medium and energy required by the conventional processes, based on the melt-extraction refining of slags, are not necessary. In conventional processes for the segregation of valuable metals on the basis of a slow cooling of sulfur-bearing slags, the cost distribution (%/work stage) is as follows: 7%/casting; 16%/coarse crushing, 19%/fine crushing, 40%/grinding, and 18%/froth flotation. When carrying out the process according to the present invention, owing to the mechanically weak structure of the product slag, the costs of coarse and fine crushing, and also the cost of grinding, can be substantially decreased as compared with conventional processes.

In order to elucidate the details of the new process, as well as the differences between it and the conventional extraction method, the processes are discussed with the aid of examples. The bases of calculations, the phase diagrams, and the material and heat balances relating to the examples are shown in Tables 1-6. Examples I and II are comparison examples which are based on the state of the art.

The fayalite slag phase [(1), Table 2] corresponding to the examples was obtained by suspension smelting of copper concentrate. The analysis of the copper matte corresponding to the slag phase (% by weight) was as follows: 76.11 Cu, 2.55 Fe, 0.36 Ni, 0.08 Co, 19.78 S and 0.32 O. The iron sulfide activity obtained (°10, Table 1) for a matte phase in equilibrium with the slag phase (1) is: $a_{FeS} = 0.037$. The imputed content of sulfur (°9) in the slag phase is thus 0.24 % S, which is nearly the same as the analysis value (0.29 % S).

The oxygen pressure obtained (°8) for the slag phase (1) at 1300° C. is $P_{O_2} = 2.89 \times 10^{-8}$.

The value obtained (°12) for the Nernst's distribution of copper in the matte-slag phase is $\gamma = 33.41$. The content of copper in the slag phase is thus 2.28 % Cu, i.e. close to the analysis value (2.42 %).

EXAMPLE I

Figure 1:
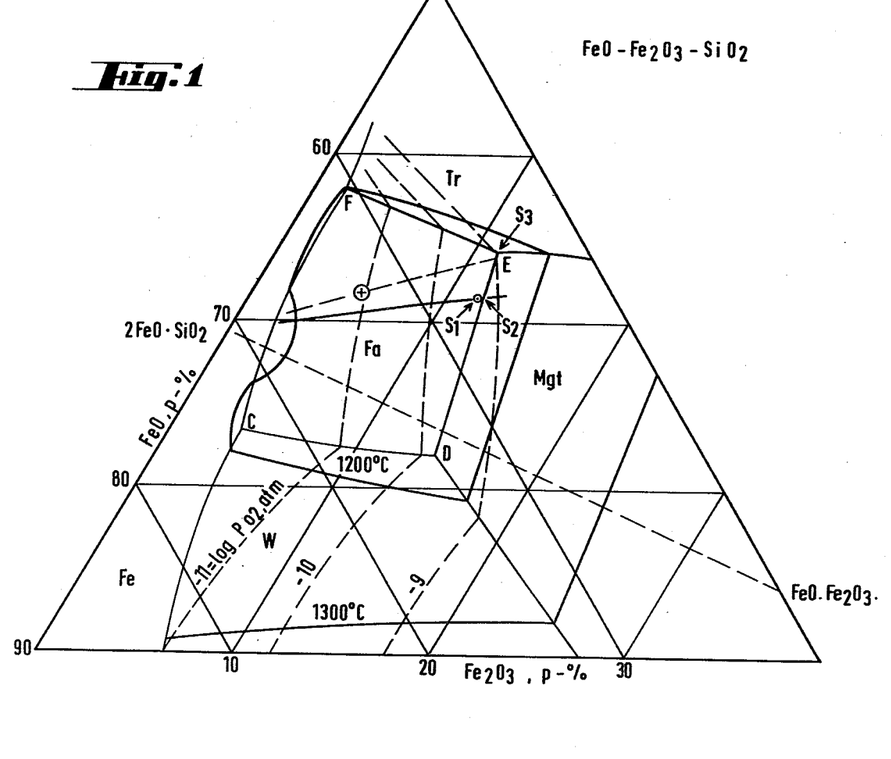
FIG. 1 is an equilibrium diagram of the melt system $FeO$—$Fe_2O_3$—$SiO_2$.

Crystallization of the slag phase by cooling. The position of the slag phase (1) under discussion is indicated by S in the equilibrium diagram of the system $FeO - Fe_{1.5} - SiO_2$, FIG. 1. When the slag phase has cooled to a temperature of approx. 1170° C., olivine begins to crystallize out from it in the direction $Fe_2SiO_4$—$(S_1)$, until the magnetite saturation limit DE is reached [molten $(S_2)$] at approx. 1143° C. The crystallization follows the saturation boundary DE, olivine and magnetite crystallizing together, until at 1140° C. invariant E [molten $(S_3)$] is reached, at which the melt solidifies.

The presence of copper in the slag phases alters the crystallization process slightly and thereby also the balance in Table 2. The activity ratios between copper and its compounds and the other phases are not known sufficiently, and therefore the equilibriums under discussion are only qualitative.

When the melt phase (1) is cooled to 1140° C., a ternary saturation point of the components (Cu(l), $Fe_3O_4(s)$ and $SiO_2(s)$) is reached. The Nernst's distribution calculated (°12) as regards copper in the equilibrium system is in this case $\gamma = 51.4$. The copper solubility of the melt thus corresponds to the value $(Cu) = 1.94\%$ by weight. The quantities of material in the balance, corresponding to a temperature of 1140° C., are thus: melt phase (03) 767.38 kg + $Fe_2SiO_4(s)$ 163.90 kg + $Fe_3O_4(s)$ 59.51 kg + Cu(l) 9.21 kg. The analysis of the melt (03) is as follows: 1.036 FeS + 10.954 $FeO_{1.5}$ + 52.363 FeO + 33.448 $SiO_2$ + 2.200 $CuO_{0.5}$ (1.95% Cu).

The phase in equilibrium (°11) with metallic copper at 1140° C. is a solid solution $(Cu_xFe_{3-x}O_4)$ of iron spinel $(FeFe_2O_4)$, having a composition of $Cu_{0.03}Fe_{2.97}O_4$ (~0.72% by weight Cu). When the temperature decreases slowly, the spinel dissociates so that in equilibrium components Cu, $Cu_5FeS_4$, $Fe_3O_4$ and $Fe_2SiO_4$ are in the solid phase, the sulfur amount of the melt thus combining with iron and copper to form bornite. Judging from the analysis of the product slag phase, it could be assumed that it would be easy to separate the copper and the bornite from the slag matrix by settling (or by froth flotation methods from a solid phase). The situation is not, however, favorable for the use of the said methods.

The viscosity of the slag phase increases when the temperature decreases (°3) from 1300° C. to the initial temperature of the primary crystallization, 1170° C., over a range of $\eta = 0.90-2.41$. At the beginning of the primary crystallization, the melt is already in equilibrium with metallic copper, and so, taking into account the great density difference between the metal and slag phases (°2, $\Delta\gamma = 8.03-3.60$), the low viscosity of copper and the high surface energy, the metal should separate rapidly from the slag phase by settling (°1). However, this does not occur, since the metallic copper separates with too small a particle size. According to experience, the metal and matte drops passing through the melt having a diameter range of $d = 10^{-5}-10^{-2}$ cm. If the slag bed height is assumed to be 30 cm, a time range of $t = 3.3 \times 10^4 - 0.8$ h is obtained for the retention times of the settling of the metal drops, corresponding to the said particle size range at 1170° C. Under the effect of the primary crystallization, when the temperature decreases to 1140° C., the viscosity of the slag already increases to a high value, i.e. approx $\eta = 8.1$. In this case the respective retention times of settling are $t = 1.1 \times 10^5 - 2.8$ h. The retention times for settling would thus be technically sufficient if the small melt drops only combined to form sufficiently large ones.

The combining of small metal and matte drops is rapidly prevented by the formation of a primary crystallization, since the drops more or less wet the surfaces of the crystallization, in which case adhesion energy prevents the drops from combining. In this context the surface phenomena can be discussed only very qualitatively.

If a range of $d = 10^{-5} - 10^{-2}$ cm is assumed as the drop size range of copper passing through the melt, the number of small drops required for the formation of a large drop, representing the value range, is $10^9$. When drops combine, the quantity of surface eliminated from the system is $\Delta A = 10^{-1}\pi$. At 1100° C. the surface energy of pure copper is $\tau = 1220$, and thus the energy released in the combining of drops is $E = 122 \times \tau$. Pure copper wets the oxides of low atmospheric stability (e.g. $Al_2O_3$, MgO, $ZrO_2$). At 1100° C., the system Cu(l)—MgO(s) has a wetting angle of $\theta = 143°$, as measured against the melt. The value obtained for the adhesion energy is $W = 244$. The total wetting surface obtained for small-sized $d = 10^{-5}$ cm) drops is $A = 9.3 \times 10^{-3} \times \pi$, and thus the value obtained for adhesion energy is $W_A = 2.3 \times \pi$.

When an atmospherically sensitive oxide, here NiO, is added as a solid solution to the said oxide, the wetting angle decreases as a function of the amount added. In the system Cu(l)—NiO(s) the wetting angle is only $\theta = 10°$. Under the effect of oxygen becoming adsorbed to the copper, its surface energy decreases to $\tau = 550$. The value obtained for the energy released in the decreasing of surface area in connection with small-sized drops is $E = 55 \times \pi$. The total wetting surface of the drops is $A = 2.43 \times 10^{-1} \times \tau$, and thus the adhesion energy is $W_A = 266 \times \pi$ erg ($W = 1092$ erg/$cm^2$).

Characteristics analogous to copper can be observed regarding molten nickel and solid phases. As regards stable oxide phases, $Al_2O_3$ and $ZrO_2$, the wetting angles at 1550° C. are respectively $\theta = 138°$ and 118°. As regards the oxides of nickel and cobalt, the wetting angles are respectively $\theta = 70°$ and 58°. Under the effect of adsorption, the surface energy of pure metal ($\tau = 1725$) decreases to values $\tau = 1100$ and 1400, respectively. It should be pointed out that, in the system Ni(l)—$Al_2O_3$, an addition of an alloying agent, 2.2% by weight Ti, to the nickel does not change the surface energy value of nickel, but it decreases the wetting angle from $\theta = 138°$ to $\theta = 72°$ (also the phase interface tension lowers from $\tau 2205$ to $\tau = 410$.

It can thus be noted that the adsorption phenomena between molten metal phases and solid (also molten) oxide phases, affecting the drop size, are functions of several factors. The separation of a suitable solid phase from the slag phase has an advantageous effect on the growth of the metallic drop size. However, in practice even a very low rate of wetting prevents the combining of melt drops (in spite of a low adhesion energy). As regards sulfide melts and molten and solid oxides and their mixtures, the adsorption phenomena are in many respects analogous. The surface energy values of the sulfide melts are, however, lower than those of metal melts. The wetting between sulfides and oxides is, however, more complete than in corresponding metal systems.

The sulfides of iron and lead wet iron silicates completely, in which case the values of adhesion energy, corresponding to a wetting angle of $\theta = 0$ at 1300° C. are $W = 670$ and 380. Chalcocite wets iron silicate at a rate corresponding to an imputed wetting angle of $\theta = 46.8$. The surface and phaseboundary energies of chalcocite are $\tau = 378$ and 165, and thus the value obtained for adhesion energy is $W = 637$. As regards chalcocite, the decrease in surface energy, corresponding to the combining of drops discussed above, is $E_A=38\pi$, and respectively the total adhesion energy of the drops is $W_A=52\pi$. In the following, certain practical measurements of surface energy ratios are discussed as regards a nickel-copper matte (30 Ni, 26 Cu, 20 Fe, and 24 S) and an iron silicate slag phase (Surface Phenomena in Metallurgical Processes, Consultants Bureau, New York, 1965, 144). The surface energy value of sulfide matte is $\tau=381$. The following table shows the values of the phase-boundary energy (sulfide/silicate) of the system, the density and viscosity of the silicate melt, and its mechanical losses of nickel (Ni content, % by weight), as functions of the $SiO_2$ content of the silicate.

| $SiO_2$ | $\tau$ | $\gamma$ | $\mu$ | (Ni) |
|---|---|---|---|---|
| 20 | 87 | 4.1 | 0.39 | 1.54 |
| 25 | 123 | 3.9 | 0.56 | 0.64 |
| 30 | 167 | 3.7 | 0.83 | 0.41 |
| 35 | 246 | 3.5 | 1.32 | 0.26 |
| 38 | 323 | 3.4 | 1.80 | 0.19 |

It can be shown that the relation between the phase boundary energy and the content of nickel in the slag phase is hyperbolic, i.e. here $(Ni)=32/(\tau-70)-0.1$.

it can be observed from the values shown in the table that, in spite of the increased slag viscosity, the nickel losses from the slag phase decrease sharply under the effect of the increased phase-boundary energy and the correspondingly decreased adhesion energy.

EXAMPLE II

Sulfidization of the slag phase in a molten state at a constant temperature.

Conventional extraction of the copper of a slag phase (1) by means of iron sulfide at 1300° C. is discussed as an example. The material and heat balances corresponding to the extraction are given in Table 3. During the extraction, the melt phases pyrrhotite and slag phase (1), if they are well mixed, react until they reach an equilibrium. In this case the sulfide phase extracts from the slag phase an equilibrium quantity of ferric iron and copper through a conversion reaction:

When the concentration of the copper matte produced is adjusted to a value of $[Cu]=20\%$ by weight, i.e. not taking into account the low $SiO_2$ content ($\sim 1.5\%$), the composition of the matte is adjusted to $Cu_2S$ 25.05; FeS 55.98; $Fe_3O_4$ 18.97, a portion of the ferric iron present in the slag must be reduced in addition to the extraction. The reducing reaction can be carried out by means of either fossil fuel or iron sulfide, i.e.

The values °8, °9, °10, °12) corresponding to the equilibrium of the system can be calculated from the product analyses of Balance Table 3:
$\log(a_{FeO}/a_{FeO_{1.5}})=0.678$; (S)=3.59% by weight
Sulfide matte: $A_{FeS}=0.521$; (S)=3.59% by weight
Copper distribution: $\gamma_{Cu}=60.94$; (Cu)=0.33% by weight
The analysis values obtained from Balance Table 3 are: (S)=3.59% by weight and (Cu)=0.41% by weight.

When the heat losses from the system are assumed as 20 Mcal/h.t, it can be observed from the heat balance calculation that, when carried out at temperatures of 1300° C. and 1200° C., the extraction process requires 72.4 and 41.7 Mcal/t energy, respectively. The consumption of both energy and iron sulfide (17% of the slag amount) by the extraction process is very high.

EXAMPLE III (ACCORDING TO THE PRESENT INVENTION)

Sulfidization of the slag phase within the range of the primary crystallization and at a decreasing temperature. According to the invention, the sulfidization of the slag phase is carried out as the temperature of the melt phase decreases to the point where the first silicate groups of high temperature begin to segregate from it as a primary crystallization.

Figure 2:
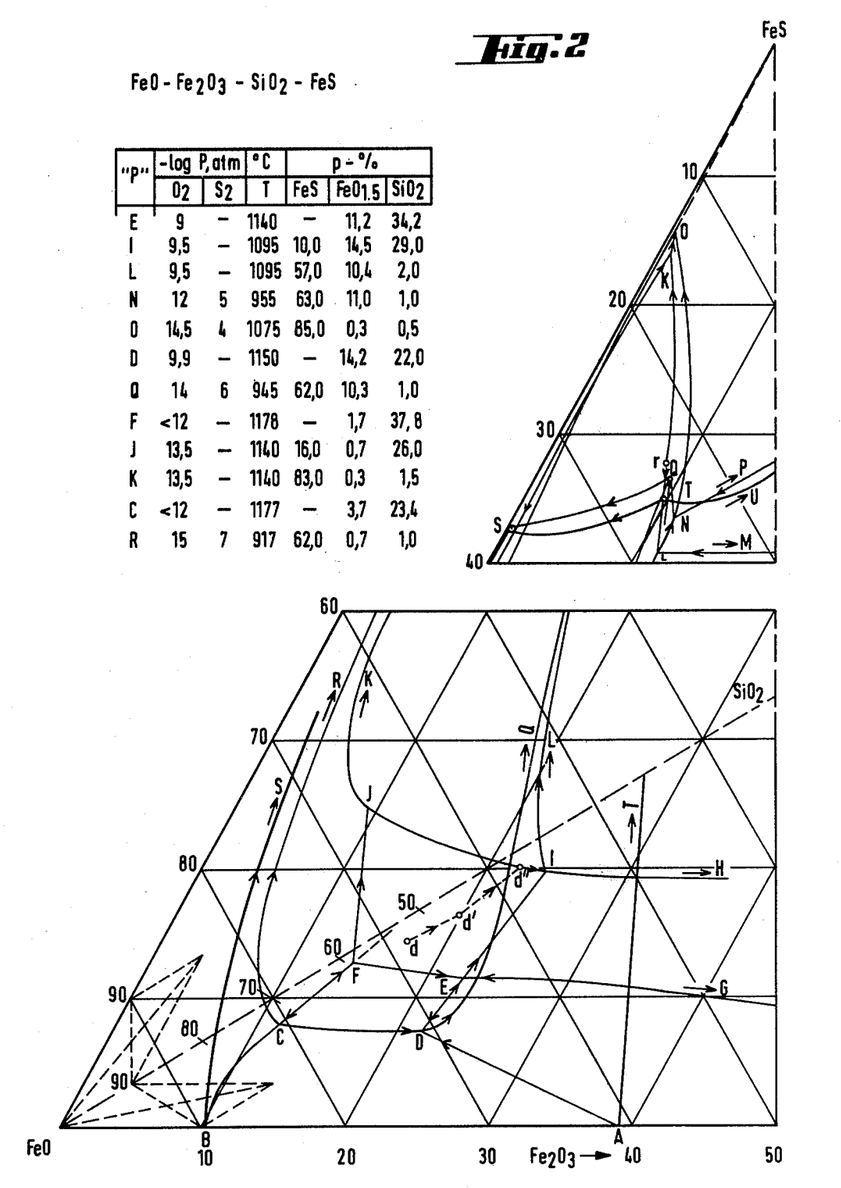
FIG. 2 is an equilibrium diagram of the melt system $FeO$—$Fe_2O_3$—$SiO_2$—$FeS$.

When iron sulfide is added as an additional constituent to the melt system $FeO-FeO_{1.5}-SiO_2$ discussed above, the equilibrium diagram given in FIG. 2 is obtained within the range under discussion. The melt compositions, temperatures and pressures of the most important invariant equilibriums are indicated in the diagram. The solidification of melt composition d in the fayalite volume is discussed as an example (FIG. 2). When the temperature decreases, fayalite segregates from the melt and point d shifts to position d' on invariant plane EFJI, where tridymite segregates. When the melt composition changes, point d" is reached on univariant equilibrium curve JI, where highsulfur melt r separates at the intersection of the isothermal surface running through composition d" and univariant equilibrium curve KL. When the temperature of the system decreases further, melts d" and r change, towards the compositions of invariant points I and L. Fayalite, tridymite, magnetite and sulfide melts separate until all of melt I has been consumed. The composition of sulfide melt L changes along equilibrium curve LN to point N, at which pyrrhotite separates, and the melt enriched with wüstite reacts with silicic acid. The melt solidifies at point N, and the final products are thus fayalite, tridymite, magnetite and pyrrhotite. The compositions of the conjugate melts corresponding to points I and L are given in the table of FIG. 2. If sulfur and oxygen are assumed to have the same value in silicate solution I, the structural oxygen pressure obtained (°8) for the silicate solution at 1090° C. is log $P_{O2}=-9.45$. Conjugate melts I and L are in equilibrium with magnetite. The value obtained (°10) for the FeS activity in the sulfide melt (L) is: $a_{FeS}=0.51$ (molten L: $N_{Fe}=0.4868$, $N_S=0.2621$). The gas phase equilibrium (°10) is thus: $P_{S2}=3.95\times 10^{-2}$, $P_{SO2}=96.05\times 10^{-2}$. The value obtained from the $S_2/SO_2$ equilibrium for the oxygen pressure is log $P_{O2}=-9.38$, a value which corresponds well to the abovementioned oxygen pressure value calculated from the silicate system (I). The effect of copper on the system under discussion is not known quantitatively. As regards the conjugate melts corresponding to invariant points I and L, it can, however, be assumed that the equilibriums change directly in accordance with the activity conditions of the desired equilibrium sulfide.

When the sulfide matte composition (Cu 40.0, Fe 32.8, S 23.7 and O 3.5) corresponding to a copper concentration of 40% by weight Cu is selected as the composition of the equilibrium sulfide, the value obtained for the FeS activity in the sulfide melt is $a_{FeS}=0.37$. At 1090° C., the composition of the equilibrium gas phase in the system $S_2-SO_2$ is thus: $P_{S2}=2.69\times 10^{-2}$, $P_{SO_2}=97.31\times10^{-2}$ and $P_{O_2}=5.16\times10^{-10}$ (log $P_{O_2}=-9.29$). Thus the sulfur solubility of the silicate melt (I) decreases, under the effect of copper addition, from the equilibrium concentration corresponding to iron sulfide, (S)=3.65, to a lower value, (S)=2.51% by weight. The concentration of copper in the conjugate silicate is in this case (°12) one corresponding to a value of (Cu)=0.49% by weight (equilibrium, $\gamma_{Cu}=82.2$).

In the process according to the invention, solid sulfide is fed as thin layers (e.g. by using the suspension technique) between the slag melt layers cast on the ground or in chills. when pyrite is used as the sulfidizing agent, the phenomena occurring in the system are qualitatively as follows:

The temperature of the pyrite rises rapidly, and the temperature of the melt decreases respectively. Pyrite begins to dissociate to pyrrhotite and elemental-sulfur vapor. The half lives of dissociation are (°5) at 600° C., 700° C. and 800° C., respectively, 117 s, 5.7 s and 1.0 s. As the temperature of the sulfide continues to increase and as the sulfide reacts with the iron oxides of the melt, the pyrrhotite melts in large quantities below the melting point of troilite (~1195° C.). The dissociation of pyrite and the melting reactions require the following heat amounts:

| | |
|---|---|
| $FeS_2(s)$ | 298°–1000° K., H = 12.432 kcal/mol |
| $FeS_2(s)-FeS(s)+2(g)$ | 1000° K., H = 34.131 kcal/mol |
| $FeS(s)+\frac{1}{2}S_2(g)$ | 1000°–1468° K., H = 9.157 kcal/mol |
| $FeS(s)-FeS(l)$ | 1468° K., H = 7.730 kcal/mol |

The amount of heat consumed in the dissociation of pyrite is thus quite high. The dissociation and melting reactions of a pyrite quantity according to the material balance of Table 4 require a heat amount of $\Delta H=19.58$ Mcal, and thus, when the cooling is even, the decrease in the temperature of the silicate melt is $\Delta T=71.4°$ ($\Delta T\times273.932\times10^{-3}=19.568$).

Figure 3:
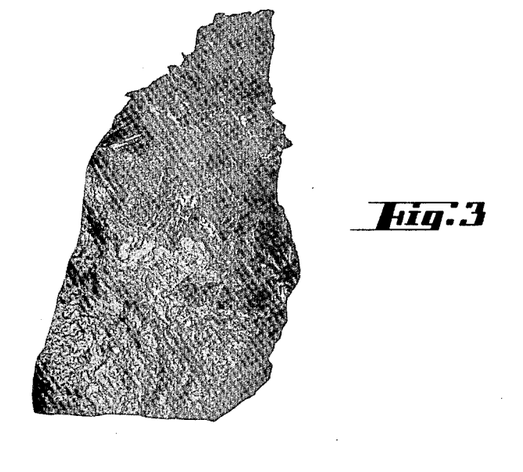
FIG. 3 is a photograph showing crystals in slag produced according to the invention.

Owing to the high absorption of heat by the pyrite reactions, the silicate melt around the sulfide layer supercools sharply. Substantial nucleation being prevented, the linear growth rate of the primarily segregating olivine crystallization becomes critically high, since the amount of heat (22.0 kcal/mol $Fe_2SiO_4$—17.0 kcal/mol $Mg_2SiO_4$) released as a result of the crystallization is immediately absorbed in the supercooled silicate melt. From the interface between the layers of silicate melts and sulfide there grows, towards the melts, a compartmental cell structure (FIG. 3) of rather large (1 mm×1 cm²), plate-like olivine crystals. The crystals of the cellular crystallization also have a strong structural orientation. In the diffraction studies of the structure, reflections were obtained only of (112)-plange groups (lattice orthorhombic, $V_H^{16}$—Pb n m (62), reflections: d=2.46–2.47 Å).

The pressure (°6) at the boundary between the dissociation gases of pyrite and their reaction products obviously increases to a high value, since the sulfide and silicate melts have squirted out of the cellular structure of the primary crystallization, whereby only the cellular structure has been left at the original layer boundary. Owing to both the cellular structure and the macro- and micro-porosity widely surrounding it, the solid slag phase is easily crushable and grindable.

As segregations are produced, the viscosity of the silicate melt increases rapidly, thereby slowing down settling of the iron sulfide melt (and promoting its dissolving in the silicate melt) and, respectively, the rising of gas bubbles. The elemental-sulfur vapor effectively reduces the valuable-metal oxides and ferric iron of the slag melt. When necessary, the reduction can be enhanced by feeding, together with sulfide, a solid fossil reductant into the system. Iron sulfide, for its part, sulfidizes the valuable-metal oxides as a result of the conversion reactions, e.g. $2\ CuO_{0.5}+FeS\rightleftharpoons2CuS_{0.5}+FeO$: [X $FeO.SiO_2$:(l)].

What is surprising is the rapidity of the reduction and sulfidization of the valuable-metal oxides. The mechanism of the sulfidization has not yet been explained. It is evident that adding the sulfide in layers produces effective autogenic mixing (and even dissolving of sulfide) between the sulfide and silicate melts. It is evident that the reactions, as well as the cellular crystallization, may be affected by the more or less linear pressure of the gas phase generated; when the pressure approaches the critical range, it causes changes in the conditions of material transfer, saturation and equilibrium in the system. The gas phase formed by elemental sulfur and its compounds may also act as an effective mineralizing agent in the system.

As regards both the primary and the main crystallization, the system under discussion resembles the system $FeO-FeO_{1.5}-FeS-SiO_2$ discussed previously. When crystallization occurs, the concentration of sulfur in the silicate solution increases, and the equilibrium curve JI (FIG. 2) is reached, whereby conjugate melts are formed. When all of the silicate conjugate has been consumed, the sulfide conjugate reacts, as the temperature decreases, in the manner described above, until the sulfide melt solidifies in the vicinity of point N, within a temperature range of 955°–840° C., depending on the copper concentration.

Table 4 shows the material and heat balances, corresponding to the melt silicate under discussion, of the sulfidization process according to the invention.

According to the material balance, with slag composition (l), only 37 kg pyrite is required per one tonne of slag. The concentration of copper in the sulfide matte obtained in the slag matrix in approx. 40% by weight Cu.

From the segregation balances of the heat balance it can be observed that the heat amount released within the range of the primary segregation suffices well for covering the heat amount required by the pyrite reactions, and that a sufficient heat amount is still left to cover the losses of heat due to the casting on the ground or in chills. The solid slag phase obtained from the process is porous and can therefore be crushed and ground at low cost. Owing to its large particle size, the slag sulfide can easily be froth flotated.

The finely-divided "clouds" of valuable metal and its sulfides, which are formed from low-sulfur slag phase in conventional cooling and are difficult to recover, are prevented by the new process.

The high amounts of sulfide and additional energy required by extraction processes are unnecessary in the process according to the invention. The slag concentrate obtained according to the new method has even initially a high (and, in addition, controllable) metal content, and therefore the multi-stage processes required in extraction for increasing the matte concentration are not necessary. Since, in the present process, the sulfidizing agent is injected as a thin layer onto the slag surface, the mixing effect is produced automatically. Therefore the mixing of melt at a high temperature, which is difficult to implement but necessary for the realization of extraction processes, is not necessary.

Within the range of the conjugate melts corresponding to the invariant points (I-L, FIG. 2) of the system, the concentration of valuable metals in the silicate solution in equilibrium is already so low that the system could be cooled rapidly, should there be reason. Thus the slow cooling of the slag phase, necessary in conventional slag flotation processes in order to increase the particle size of valuable metals and their compounds by diffusion transfer, is not necessary in the new process.

EXAMPLE IV

Sulfidization of slag phases of the type $CaO$—$MgO$—$AlO_{1.5}$—$SiO_2$ in accordance with the invention.

In addition to the slag phases of the fayalite range discussed above, low-iron slag phases of the pyroxene-forsterite-anortitemelilite range are discussed briefly with the aid of an example. The material and heat balance values corresponding to the example are in Table 5 (the balances are per one tonne of slag melt, but the charge in the pilot experiments was only 230 kg).

The analysis of the slag phase under discussion was as follows: 14.4 Cu, 2.0 Pb, 4.5 Fe, 0.5 Zn, 4.0 $KO_{0.5}$, 15.1 CaO, 10.8 MgO, 10.4 $AlO_{1.5}$, and 33.8 $SiO_2$.

The primary crystallization of melt compositions corresponding to the basic slag in the system $CaO$—$MgO$—$AlO_{1.5}$—$SiO_2$ consists of forsterite, which segregates immediately below 1400° C. Within the composition range of the melt, the saturation limit of the liquidus as regards MgO is one corresponding to the equation: $(MgO) = \exp[8.407 - 9.013/T]$. After forsterite, there segregate, as a silicate main crystallization, depending on the composition, the pyroxene series, melilite (gehlenite + åkermanite) and anortite within the temperature range 1240°–1350° C.

The silicate slag under discussion is not sensitive to temperature, since the $Fe^{+2}/Fe^{+3}$ equilibrium system, characteristic of fayalite systems, is lacking or is present in too low a quantity to affect the matrix. However, the transfer of oxygen within the system is slightly affected by the $Cu^{+1}/Cu^{+2}$ equilibrium system, even at high concentrations, depending on the degree of oxidation. Since diffusion transfer of oxygen in the system is technically too slow, the reduction and sulfidization of valuable metals can occur effectively only under the effect of direct contact with the reductant. Therefore, very effective mixing of the melt phase with the reductant is required during the reduction of slag. The mixing of the reductant with the melt is complicated by the high viscosity of the slag phase. The viscosities (°3) of the basic slag at 1400° C. and, within the range of the primary crystallization, at 1250° C. are $\eta = 24$ and 137, respectively. Under the effect of the additives (Fe, etc.) the viscosity of the example slag is lower, but from a technical viewpoint only slightly so (at the above temperatures: $\eta = 10$ and 47).

The reduction of the valuable-metal oxides of the slag phase under discussion, by means of a fossil fuel, takes place rapidly and completely. However, the micro-drop formation of the valuable metal, due to surface phenomena, together with the high viscosity of the slag, prevents the use of slag settling methods. Owing to the high temperature of the silicate melt, for example, lead also forms micro-drops because of the formation of a gas phase. The separation of valuable metals by melt extraction is, of course, more successful than conventional settling. However, when froth flotation techniques are used, the solid slag must be ground very fine in order that the valuable metal in the form of microdrops can be separated from the silicate matrix.

When, for example, iron sulfides are used for the reduction and sulfidization of the valuable-metal content by the same process as used for fayalite melts, phenomena analogous to fayalite slags can also be observed. The pyrite fed between the slag layers dissociates rapidly. The forming elemental sulfur penetrates into the silicate phase above the sulfide, causing a rapid reduction of the valuable-metal oxides in it. Correspondingly, the molten pyrrhotite begins to settle slowly through the slag melt, causing, through conversion reactions, metallization and sulfidization ($CuS_{0.5}$, Cu) of the valuable-metal oxides.

Upon examination of the topmost layer of the solidified slag phase, on top of which no sulfide had been added, it was observed that the valuable-metal oxides had been reduced to a rather high degree by the effect of the gas phase rising from below. Sulfides of copper were not present in the layer, but copper and copper oxidule were present as independent phases. Within the range of the primary crystallization (forsterite), the concentration of copper in the silicate matrix varied between 0.47 and 0.66% Cu. The concentration of copper within the pyroxene range was on the average 0.17% Cu.

Figure 4:
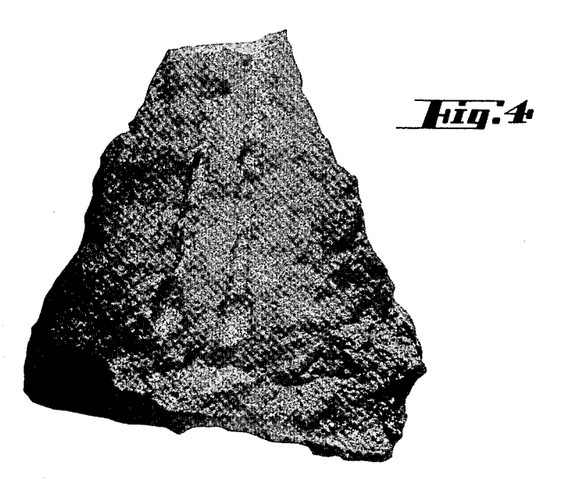
FIG. 4 is a photograph of a sample of a slag produced according to the invention.

Within the sulfide range, chalcocite was present together with metallic copper. The copper solubility of silicates corresponded to that of the oxide range. By the effect of the reduction gases, a very dense network of pore conduits had been formed at the sulfide-slag boundary. There were thin gas conduits in such high numbers that the entire cast matrix was mechanically very weak and therefore easily grindable. The photograph of the slag sample shown in FIG. 4 also shows large pore conduits with upper ends inflated by pressure. On the surface of the pore conduits, there were a great number (caused by the large wetting angle) of nearly spherical copper drops.

In accordance with the heat balance, Table 5, the additional heat introduced into the system by the forsterite segregation suffices not only for the reduction and melting reactions but also for covering the losses of heat. Calculating from the heat values (°13), it can be observed that the decrease in the temperature of the slag melt from the initial value (1400° C.) to the initial temperature of the primary crystallization ($\sim 1355°$ C.) does not produce sufficient heat in the system for the dissociation of pyrite and the melting of pyrrhotite (balance difference: 17.1 Mcal).

On the basis of the discussion it can be noted that the reduction sulfidization method developed for fayalite slags is also suitable for low-iron silicate slags. Owing to the high melting temperatures and the complicated mechanism of crystallization, the realization of the process with slag melts having, for example, the matrix $MgO$—$CaO$—$AlO_{1.5}$—$SiO_2$ is undoubtedly more difficult than with fayalite slags. However, better results can be obtained with sulfides soluble in the slag matrix than with iron sulfides. For example, the solubility of calcium sulfide in the slag melt increases in the presence of magnesium oxide, and at the same time both the surface energy and the density of the melt decrease. However, adding pyrite together with other sulfides is appropriate in order to produce a pore network which facilitates the grinding of the slag.

EXAMPLE V

Distribution of the valuable-metal components between the sulfide and silicate phases during the crystallization of a fayalite melt in accordance with the invention The last example to be discussed is the distribution of the valuable metals Cu, Ni, Co, Zn, and Pb between the conjugate melts. The fayalite melt phase was sulfidized by layer sulfidization at a decreasing temperature within the range of the primary crystallization. The casting of the slag and the subsequent cooling were carried out in chills. The material and heat balances corresponding to the process are in Table 6.

At the time of the casting, the temperature of the feed slag [(24), Table 6] was approx. 1325° C. The oxygen pressure calculated (°8) from the composition of the slag was $P_{O_2} = 1.02 \times 10^{-6}$ atm.

The primary crystallization began to segregate at approx. 1160° C. According to diffraction analysis, the MgO content of this crystallization was high. The crystallization corresponded to the composition: $Fe_{1.18}Mg_{0.82}SiO_4$ ($a_o = 4.80$, $b_o = 10.39$, $Co = 6.06$ Å). In general, the temperature of the equilibriums of the system $FeO—FeO_{1.5}—FeS—SiO_2$ are used in the discussion. It is evident that the values vary to some extent as a function of the amount of oxide components not belonging to the system.

After the addition of the sulfide and the separation of the primary segregation, the oxygen pressure of the melt phase (27) at 1140° C. corresponds to a value of $P_{O_2} - 1.05 \times 10^{-9}$. The imputed oxygen pressure in the slag phase (24) supercooled to 1140° C. is one decade higher, i.e. $P_{O_2} = 1.93 \times 10^{-8}$ (the slag becomes reduced by the sulfide addition).

The Nernst's distributions of the valuable metals present in the conjugate melts (J-K) in equilibrium with iron are, at 1150° C. (Econ. Geol. 71, 1976, 1049):

$$\gamma_{Cu} = 50, \gamma_{Ni} = 150, \gamma_{Co} = 7, \text{ and } \gamma_{Zn} = 0.5.$$

The valuable-metal distributions between the conjugate solutions (I-L) of the magnetite boundary were not measured. The distribution values can, however, be estimated on the basis of the approximation equations (°12) of Table 1. At 1140° C. the value obtained (°10) for the iron sulfide activity in the melt is $a_{FeS} = 0.45$, and the value obtained for the oxygen (sulfur) pressure corresponding to this melt is $P_{O_2} = 1.24 \times 10^{-9}$ ($P_{S_2} = 3.46 \times 10^{-2}$). The oxygen pressure in the silicate melt (27) and the sulfide melt (31) thus correspond to each other. The oxygen pressures corresponding to the conjugate silicate (29) at 1140° C. and 1095° C. are, respectively, $P_{O_2} = 3.09 \times 10^{-9}$ and $6.59 \times 10^{-10}$. The Nernst's distributions calculated (°12) from oxygen pressures vary, according to melt phases (27) and (29), within the temperature range 1140°–1095° C. as follows:

$$\gamma_{Cu} = 74\text{-}78, \gamma_{Ni} = 52\text{-}67, \gamma_{Co} = 6.5\text{-}8.5,$$
$$\gamma_{Zn} = 1.8\text{-}2.5, \text{ and } \gamma_{Pb} = 2.3\text{-}3.2.$$

The product slag phase (32) was ground to a particle size of 95%/−74 μm, and it was froth flotated (pH ~ 8.9—Ca(OH)$_2$—, xanthate-KAX-, Dowfroth 250), and the value thereby obtained for the concentration of copper in the waste slag (33) was 0.36% Cu. When a composition corresponding to melt (31) is assumed as the composition of the sulfide phase of the slag concentrate, and waste slag (33) is taken as the equilibrium silicate corresponding to it, the following Nernst's distributions are obtained from the corresponding analysis values:

$$\gamma_{Cu} = 72, \gamma_{Zn} = 2, \gamma_{Co} = 3, \gamma_{Ni} = 24, \text{ and } \gamma_{Pb} = 1.$$

With the exception of the values for copper and zinc, the distribution values are only half of the theoretical values. Regarding the valuable-metal distributions, the process according to the invention brings no essential improvement on the conventional values.

TABLE 1

The equations and the imputed values, with their dimensions and symbols, used in the specification of the process according to the invention are compiled in Table 1. The groups of items discussed have been numbered °1–°13, and reference is made to these notations in the specification of the process.

°1. Settling speed of a matte drop

The settling speed of metal and matte drops in the slag phase is, according to Stoke's law: $\dot{v}$, cm/s = $54.5 \times d^2 \times \Delta\gamma \times \eta^{-1}$, where d, cm = diameter of drop, $\Delta\gamma$, g/cm³ is the difference in the densities of the substances, and $\eta$, poise (dyne × s/cm²) is the viscosity of the slag phase.

°2. Density of the matte and slag phases

The densities of the metal sulfides in molten state are obtained (Met. Trans. 2, 1971, 1107) from the equations:

$Cu_2S$: $\gamma = 6.65 - 9.46 \times 10^{-4}$ (T-273)

$Ni_3S_2$: $\gamma = 8.60 - 2.92 \times 10^{-3}$ (T-273)

$FeS$: $\gamma = 8.13 - 3.44 \times 10^{-3}$ (T-273)

T, K is the temperature

The approximate density of the sulfide mixtures within the composition range under discussion is obtained by using the said density values in the determination of the molar volumes. It must, however, be taken into consideration that the mixtures deviate considerably from the ideal.

The densities of molten metals can be calculated from the equations:

$Cu \gamma$: $= 9.37 - 9.44 \times 10^{-4} \times T$ $Ni \gamma$: $= 9.51 - 10.00 \times 10^{-4} \times T$ In the melt system $FeO—FeO_{1.5}—CaO—SiO_2$, the density within the temperature range 1200°–1400° C. can be calculated from the equation:

$$\gamma = (1 - N_{SiO_2}) (71.847 N_{FeO} + 56.080 N_{CaO} + 60.086 N_{SiO_2}) \times \{N_{FeO}[(1 - 2N_{SiO_2})15.76 + 40.00 N_{SiO_2}] + N_{CaO}[(1 - 2 N_{SiO_2})21.00 + 42.70 N_{SiO_2}]\}^{-2}$$

In the melt system $CaO—MgO—AlO_{1.5}—SiO_2$, the density within the temperature range 1300°–1500° C. is obtained from the equation:

$$\gamma = (1 - N_{SiO_2})(50.980 N_{AlO_{1.5}} + 56.080 N_{CaO} + 60.086 N_{SiO_2}) \times \{N_{AlO_{1.5}}[(1 - 2NSiO_2)12.30 + 53.00 N_{SiO_2}] + N_{CaO}[1 - 2 N_{SiO_2})21.00 + 42.70 N_{SiO_2}]\}^{-1}$$

N is the molar proportion of the oxide component in the melt mixture.

°3. Viscosity of the matte and slag phases

The viscosities of the metal and sulfide melts are very low. At 1200° C., the viscosity of metallic copper is $\eta=0.03$. The approximate viscosity of the sulfide melts is independent of the composition and the temperature. Within the range under discussion, the viscosity values vary within the range $\eta=0.09-0.11$. The viscosity of iron-predominant silicate melts is obtained from the approximation equation:

$$\log \eta = 7474/T - 5.610 + 0.468Z,$$

where $$Z = (1.90N_{Al} + 3 + 2.83N_{Si} + 4)(0.87N_{Fe} + 2 + 0.73N_{Ca} + 2 + 0.95N_{Mg} + 2)^{-1}$$

The viscosity of the slag phase (1), Table 2, within the range of the primary crystallization (temperature $\leq 1250°$ C.) is obtained from the equation:

$$\log \eta = 15420/T - 10.004.$$

In the system $FeO-CaO-MgO-Al_2O_3-SiO_2$, the value of the melt viscosity is obtained from the approximation equation ($FeO \sim 15-30\%$ by weight):

$$\log \eta = 9644/T - 5.956 + 0.237Z$$

When the iron content in the system decreases ($FeO < 10\%$), the constant term is replaced by the expression: $-5.656 - 4.225\ N_{Fe}$, whereby the precision of the equation is enhanced.

The viscosity of the melt corresponding to slag phase (16), Table 5, containing forsterite segregation, is obtained from the approximation equation (0-20% MgO, 45-50% $SiO_2$, temperature $< 1345°$ C.):

$$\log \eta = 14300/T - 7.814 + 0.120Z$$

°4. Surface energy $\sigma$ Phase bondary energy is obtained from the equilibrium equation:

$$\theta_{LS},\ \text{erg/cm}^2 = \sigma_{SV} - \sigma_{LV} \cos \theta$$

where references L, S and V correspond to liquid, solid and vapor phases and $\theta$ is the wetting angle (as measured against the melt phase).

The equation for adhesion energy is $$W,\ \text{erg/cm}^2 = \sigma_{LV}(1 + \cos \theta) = c_1 + c_2T - c_3T^2,$$

where $c_i$ is a constant.

$W_A$, erg = A×W, where A is the surface area, cm$^2$. The surface energies of solid oxide phases vary from one lattice plane to another. The surface energies ($\sigma_x$, $\sigma_A$, $\sigma_{(1)}$) of the slag oxides: energy at plane c, approximately A and in molten state (1), are obtained (Science of Ceramics 2, Academic Press, London 1965, 364) from the equations:

MgO: $\sigma_{(100)} = 1680 - 0.308T$;
$\sigma_{(1)} = 1387(1 - T/5470)^{1.2}$

CaO: $\sigma_{(100)} = 1420 - 0.246T$ $Al_2O_3$: $\sigma_{(1014)} = 1120 - 0.216T$;
$\sigma_{(1)} = 1144(1 - T/5180)^{1.2}$ $SiO_2$: $\sigma_{(110)} = 616 - 0.128T$;
$\sigma_{(1)} = 657(1 - T/4800)^{1.2}$ FeO: $\sigma_{(100)} = 1580 - 0.306T$;
$\sigma_{(1)} = 1562(1 - T/5170)^{1.2}$ At 1200° C. the value obtained for the surface energy of melts within the composition range: 62-34 FeO, 21-0 CaO, 31-41 $SiO_2$, and 2-17 $Fe_3O_4$ is $\theta = 420 \pm 20$. The surface energy is nearly independent of the concentrations of CaO and $Fe_3O_4$ in the melt. At 1410° C. the surface energy of the system $FeO-SiO_2$ is obtained from the equation: $\sigma = 5.52[100-SiO_2] + 33$. With the conventional technical concentration of $SiO_2$ (30%) in fayalite slags the value obtained for the surface energy of the melt is $\sigma = 419$. The $SiO_2$ energies obtained for the slag components at 1200° C. from the energy equations are: $\sigma_{(110)} = 427$ and $\sigma_{(1)} = 423$. The surface energy of slags having the fayalite matrix is thus close to the value: $\sigma = 420 \pm 20$.

The surface energy of melts of the $CaO-MgO-Al_2O_3-SiO_2$ is obtained with sufficient precision by applying the equation $\sigma = \Sigma_i N_i \sigma_i$, where the partial molar $\sigma$ values used (at 1600° C.) are: $\sigma_{CaO} = 520$, $\sigma_{MgO} = 530$, $\sigma_{Al_2O_3} = 670$ and $\sigma_{SiO_2} = 400$.

The temperature dependence of the surface energy is $\delta\sigma/\delta T = 0.13$.

For the determination of the surface energy of sulfide melts (within the range under discussion, independent of the temperature), the following partial energy values are applied to the above equation: $\sigma_{Cu2S} = 380$, $\sigma_{FeS} = 348$, $\sigma_{Ni3S2} = 450$, and $\sigma_{PbS} = 190$.

The values of surface energy obtained for molten metals are:

Cu(1): $\sigma = 1701 - 0.314 \times T$

Ni(1): $\sigma = 3422 - 0.980 \times T$

°5. Dissociation of pyrite

The dissociation of pyrite according to reaction $FeS_2(s) \rightarrow FeS(s) + 1/2\ S_2(g)$ corresponds to a change in free energy ($\Delta G$, cal/mol):

$$\Delta G° = 70740 - 69.04T$$

When calculating the sulfur vapor pressure, the iron sulfide activity compared with troilite is to be placed in the equilibrium equations, i.e. (Mineral Chemistry of Metal Sulfides, Cambridge, CUP, 1978, 285-287).

$$\log a_{FeS} = 85.83(1000/T - 1))1 - N + \ln N) + 39.30 [1 - 0.9981\ N]^{\frac{1}{2}} - 39.12\ \tan g^{-1} [1 - 0 - 9981\ N]^{\frac{1}{2}} - 0.002.$$

where N is the molar proportion of iron sulfide ($FeS_{1.0}$) in the Fe-S mixture.

The speed of the dissociation of pyrite can be represented with sufficient precision as the dissociation of the first order, i.e.

$$t^{-1} \ln N_{FeS2} = -3.33 \times 10^{10} \exp(-50900/RT),$$

where t, s is the dissociation period.

°6. Vapor pressure of sulfur

The vapor pressure of sulfur within the temperature range 340°-1040° C. is obtained (Trans. IMM; C93, 1971, 11-17) from the equation:

$$\log (P, \text{atm}) = 6.00282 - 3584.42T^{-1} - 2.23934 \times 10^{-3}T + 1.14662 \times 10^{-6}T^2$$

The critical point of the vapor is at the values: 1040° C. and 204 atm. At the critical point the average number of atoms in a molecule of sulfur is 3.4[$S_{3.4}(g)$] and at the vaporization point, respectively, 6.6.

°8. Oxygen pressure equation of the slag phase

The oxygen pressure of the iron silicate slag can be calculated on the basis of the composition within saturation limits from the equation:

$$\log(P_{O_2}, atm) = -(3900/T)(N_{FeO} - N_{FeO_{1.5}}) - 4\log(N_{FeO}/N_{FeO_{1.5}})$$
$$+ (10100/T)N_{SiO_2} - (13100/T)N_{CaO}$$
$$- (26510/T) + 11.0782$$

°9. Solubility of sulfur in the slag phase

The solubility of sulfur in the slag melts with the fayalite martix is obtained from the approximation equation $$(S, \% \text{ by weight}) = 7.00\, a_{FeS}^{1.025}$$

where $a_{FeS}$ is the FeS activity of sulfide melt.

The solubility of sulfur can also be calculated from the equation:

$$(S, \% \text{ by weight}) = 1.585 \times 10^{-1} [a_{FeO}/a_{FeO_{1.5}}]^2$$

where the ratio of the activity coefficients of the iron oxides is obtained from the equation:

$$\log[f_{FeO}/f_{FeO_{1.5}}] = (975.3/T)$$
$$(N_{FeO} - N_{FeO_{1.5}}) - (2886.5/T)N_{SiO_2}$$

The said equation can be used, for example, in the absence of matte activity values. The equation is based on a partial equilibrium of the slag system and sulfur:

°10. Component activity of sulfide mattes

Within the range under discussion, copper sulfide matte behaves almost ideally in spite of its oxygen solubility. The activities of the components are thus obtained from the equations:

$$a_{FeS} = 4 \cdot N_2 \cdot N_{Fe} \text{ and } a_{Cu_2S} = (27/4) N^2_{Cu} \cdot N_S$$

When the value obtained from Egorov's function, [(O, % by weight) = 7.00 − 8.78 × 10⁻² (Cu, % by weight)] is used as the value of the O-solubility of sulfide melt, the iron sulfide activity is $$a_{Fes} = 3.071[0.800 - 10^{-2}(Cu)][3.086 - 10^{-2}\cdot(Cu)][3.397 - 10 <^2(Cu)]^{-1}$$

The gas phase in equilibrium with copper sulfide matte in the system $P_{SO_2} + P_{S_2} = 1$ in the magnetite saturation of the melt is obtained from the equation $$3 \log a_{FeS} = (512) \log P_{S_2} - 2 \log P_{SO_2} + 503/T + 2.231.$$

°11. Cu-Fe-O equilibrium

The oxygen pressure corresponding to the ternary phase equilibrium $$3\, Cu + Fe_3O_4\,(spss) + O_2(g) \rightleftharpoons 3\, CuFeO_2(s)$$

is $$\log P_{O_2} = -21325/T + 10.1641$$

The magnetite solubility of the spinel solid solution (spss), $Cu_xFe_{3-x}O_4$, is in this case $$N°_{Fe_2O_4} = \exp[331.5/T - 0.3771]$$

(also $a_{Fe_3O_4} = N_{Fe_3O_4}$, when $N_{Fe_3O_4} \geq 0.8$).

Within the range of the magnetite-wüstite equilibrium, the value of the oxygen pressure of the solid solution in equilibrium with copper is obtained with sufficient precision for this discussion:

$$\log P_{O_2} = [11310/T - 2.9128][N°_\phi/N°_\phi] - 32635/T + 13.0769,$$

where $N_\phi$ is the $CuFe_2O_4$ molar proportion in the solid solution.

°12. Nernst's distribution The Nernst's distributions of the valuable metals ($\gamma = [\%Me]matte/(\%Me)slag$), are obtained as functions of the composition and the temperature from the approximation equations $$\gamma_{Cu} = [/\Sigma_n]/(\Sigma n)]x^{10} \exp[-2064.1/T + 0.9185 - 0.25 \log P_{O_2}]$$

where $\Sigma n$ are the molar proportions of the elemental constituents of the slag oxides and sulfide, corresponding to a concentration of 100% by weight.

$$\gamma_{Ni}^{1.227} = 4.4412 \times 10^{-3} P_{O_2}^{-\frac{1}{2}}$$

$$\gamma_{Co}^{1.227} = 3.5310 \times 10^{-4} P_{O_2}^{-\frac{1}{2}}$$

$$\gamma_{Pb} = 8.128 \times 10^{-5} P_{O_2}^{-\frac{1}{2}}$$

$$\gamma_{Zn} = 6.310 \times 10^{-5} P_{O_2}^{-\frac{1}{2}}$$

°13. The basis for the calculation of the heat balances

The coefficients of the enthalpy equations of the heat balances are compiled in the table below:

| Phase | | A | B | C | D |
|---|---|---|---|---|---|
| Slag phase | (1) | 273.932 | | | 1810.028 |
| Iron sulfide | (6) | 5.483 | | | 13.380 |
| Segregation | (7) | 83.981 | 10.765 | 1.541 | 837.312 |
| Melt phase | (7) | 149.325 | | | 966.208 |
| Gas phase | (7) | 2.290 | | | 13.258 |
| Segregation | (8) | 27.028 | 2.934 | 0.663 | 284.052 |
| Melt phase | (8) | 105.322 | | | 677.583 |
| Melt phase | (9) | 3.112 | | | 6.252 |
| Slag phase | (10) | 174.693 | 32.589 | 2.962 | 1815.585 |
| Slag sulfide | (11) | 10.100 | | | 18.435 |
| Iron sulfide | (12) | 27.607 | | | 54.615 |
| Slag phase | (13) | 289.044 | | | 1815.649 |
| Matte phase | (14) | 18.173 | | | 38.424 |
| Gas phase | (15) | 0.517 | | | 3.082 |
| Slag phase | (16) | 213.233 | 11.967 | 4.455 | 250.481 |
| Segregation | (17) | 72.787 | 4.674 | 1.093 | 205.491 |
| Melt phase | (18) | 105.413 | 9.007 | 3.130 | −21.095 |
| Melt phase | (19) | 28.540 | 0.721 | 0.242 | 88.943 |
| Gas phase | (20) | 27.296 | | | 62.797 |
| Product phase | (21) | 234.036 | 14.402 | 4.465 | 336.136 |
| Segregation | (22) | 188.396 | 13.728 | 4.416 | 333.587 |
| Melt phase | (23) | 18.334 | 0.674 | 0.049 | 8.308 |

TABLE 2

Crystallization of slag phase by cooling

| | |
|---|---|
| Feed slag | 1000.00 kg melt phase (1) |
| Saturation limit, DE | 61.28 kg Fe$_2$SiO$_4$(s) + 938.18 kg melt phase (2) |
| Saturation limit | 220.17 kg Fe$_2$SiO$_4$(s) + 50.60 kg Fe$_3$O$_4$(s) + 729.23 kg melt phase (3) |
| Solid phase, E | 729.23 kg solid phase (4); product from melt phase (3) |
| Product slag | 1000.00 kg solid phase (5) |

| Component Phase Phase, No. | | T | −log P$_{O_2}$ | Cu$_5$FeS$_4$ | CuO$_{0.5}$ (Cu) | FeS (Fe$_3$O$_4$) | FeO (Fe$_2$SiO$_4$) | FeO Cu$_x$Fe$_{3-x}$O$_4$ | SiO$_2$ |
|---|---|---|---|---|---|---|---|---|---|
| Feed slag | (1) | 1573 | 7.540 | | 2.73 | 0.80 | 54.63 | 11.35 | 30.50 |
| Saturation limit, DE | (2) | 1416 | 9.372 | | 2.91 | 0.85 | 53.58 | 12.10 | 30.57 |
| Saturation limit | (3) | 1413 | 9.012 | 1.56 | 3.74 | 1.09 | 51.47 | 10.78 | 32.92 |
| Solid phase, E | (4) | 1413 | ~9.012 | 1.56 | (2.20) | — | (62.81) | (19.04) | 14.40 |
| Product slag | (5) | 298 | — | 1.14 | (1.70) | (19.30) | (67.17) | — | 10.70 |

TABLE 3

Sulfidization of slag phase in molten state at constant temperature

| | |
|---|---|
| Feed slag | 1000.00 kg melt phase (1) |
| Feed sulfide | 169.92 kg iron sulfide (12) |
| Product slag | 1068.30 kg melt phase (13) |
| Product matte | 99.00 kg melt phase (14) |
| Product gas | 2.62 kg sulfur dioxide (15) |

| Component Phase Phase, No. | | T | −log P$_{O_2}$ | CuS$_{0.5}$ (Cu) | CuO$_{0.5}$ | FeS | FeO (Fe$_2$SiO$_4$) | FeO$_{1.5}$ (Fe$_3$O$_4$) | SiO$_2$ |
|---|---|---|---|---|---|---|---|---|---|
| Feed slag | (1) | 1573 | 7.540 | (2.42) | 2.73 | 0.80 | 54.63 | 11.35 | 30.50 |
| Feed sulfide | (12) | 298 | | | | 100.00 | | | |
| Product slag | (13) | 1573 | 8.051 | (0.41) | 0.46 | 9.84 | 53.57 (71.13) | 7.58 (10.99) | 28.55 |
| Product matte | (14) | 1573 | | 25.05 (20.00) | | 55.98 | 5.89 | 13.09 (18.97) | 1.50 |

Sulfidization of slag phase in molten state at constant temperature. Heat balance.

| | Temperature. Amounts of material and heat | | | |
|---|---|---|---|---|
| Balance component | K | kg | Mcal | K | Mcal |
| Feed | | | | | |
| Slag phase | 1573 | 1000.00 | −1379.1 | 1573 | −1379.1 |
| Iron sulfide | 298 | 169.92 | −46.4 | 298 | −46.4 |
| Energy | | | 72.4 | | 41.7 |
| Total feed | | 1169.92 | −1353.1 | | −1383.8 |
| Product | | | | | |
| Slag phase | 1573 | 1068.30 | −1360.9 | 1473 | −1389.9 |
| Matte phase | 1573 | 99.00 | −9.8 | 1473 | −11.7 |
| Gas phase | 1573 | 2.62 | −2.3 | 1473 | −2.3 |
| Heat losses | | | 20.0 | | 20.0 |
| Total product | | | −1353.0 | | −1383.8 |

TABLE 4

Sulfidization of slag phase within the range of the primary crystallization

Feed phase: 1000.00 kg melt phase (1) + 37.35 kg iron sulfide (6)
Saturation limit: 468.74 kg Fe$_2$SiO$_4$(s) + 556.90 kg melt phase (7) + 11.71 kg gas phase
Conjugate melt: 139.67 kg Fe$_2$SiO$_4$(s) + 397.16 kg melt phase (8) + 18.45 kg melt phase (9) + 1.62 kg SiO$_2$(s)
Product slag: 1025.64 kg solid phase (10)
Solid phase(8 + 9): 236.48 kg Fe$_2$SiO$_4$(s) + 74.66 kg Fe$_3$O$_4$(s) + 43.97 kg SiO$_2$(s) + 60.50 kg sulfide

| Component Phase Phase, No. | | T | −log P$_{O_2}$ | −log P$_{S_2}$ | CuS$_{0.5}$ (Cu) | CuO$_{0.5}$ (MeS) | FeS | FeO (Fe$_2$SiO$_4$) | FeO$_{1.5}$ (Fe$_3$O$_4$) | SiO$_2$ |
|---|---|---|---|---|---|---|---|---|---|---|
| Feed slag | (1) | 1573 | 7.540 | — | — | — | 2.73 | 0.80 | 54.63 | 11.35 | 30.50 |
| Feed sulfide | (6) | 298 | — | — | — | — | 39.68 | — | — | |
| Melt phase | (7) | 1415 | (9.372) | — | — | 4.89 | 7.05 | 47.91 | 10.19 | 29.95 |
| Melt phase | (8) | 1368 | 9.335 | 1.570 | — | 4.79 | 6.91 | 45.83 | 13.89 | 28.58 |
| Melt phase | (9) | 1368 | 9.335 | 1.570 | 49.59 | — | 36.91 | 3.90 | 8.62 | 0.98 |
| Product slag | (10) | 298 | — | — | — | (5.90) | — | (80.95) | (7.28) | 5.87 |
| Product sulfide | (11) | 1228 | 10.856 | 1.590 | 50.09 | — | 37.29 | 3.92 | 8.70 | — |

Heat balance.

| Melt phase (1) - Saturation limit (7) | Saturation limit (7) - Conjugate melt |
|---|---|
| Temperature. Amounts of material and heat | Temperature. Amounts of material and heat |

TABLE 4-continued

Sulfidization of slag phase within the range of the primary crystallization

| Balance component | | K | kg | Mcal | K | kg | Mcal |
|---|---|---|---|---|---|---|---|
| Feed | | | | | | | |
| Slag phase | (1) | 1573 | 1000.00 | −1379.1 | | | |
| Iron sulfide | (6) | 298 | 37.35 | −11.7 | | | |
| Product | | | | | 1415 | 1037.35 | −1460.8 |
| Total feed | | | 1037.35 | −1390.8 | | 1037.35 | −1460.8 |
| Product | | | | | | | |
| Segregation | | 1415 | 468.74 | −695.8 | 1368 | 468.74 | −701.2 |
| Segregation | | | | | 1368 | 141.29 | −241.1 |
| Melt phase | (7) | 1415 | 556.90 | −763.9 | | | |
| Melt phase | (8) | | | | | 397.16 | −533.5 |
| Melt phase | (9) | | | | | 18.45 | −2.0 |
| Gas phase | | 1415 | 11.71 | 1.0 | | 11.71 | −1.0 |
| Heat loss | | | | 69.9 | | | 18.0 |
| Total product | | | 1037.35 | −1390.8 | | 1037.35 | −1460.8 |

TABLE 5

Sulfidization of slag phases of the type CaO—MgO—AlO$_{1.5}$—SiO$_2$.

Heat balance.

| | | Melt phase (16) - Primary segregation (17) Temperature. Amounts of material and heat | | | Primary segregation (17) - Main segregation (22) Temperature. Amounts of material and heat | | |
|---|---|---|---|---|---|---|---|
| Balance component | | K | kg | Mcal | K | kg | Mcal |
| Feed | | | | | | | |
| Slag phase | (16) | 1673 | 1000.00 | 142.42 | | | |
| Iron sulfide | | 298 | 60.91 | −27.64 | | | |
| Product phases | I | | | | 1550 | 1060.90 | 64.10 |
| Total feed | | | 1060.91 | 114.78 | | 1060.90 | 64.10 |
| Product | | | | | | | |
| Primary segregation | (17) | 1550 | 353.33 | −80.74 | | | |
| Silicate melt | (18) | 1550 | 451.54 | 208.14 | | | |
| Sulfide melt | (19) | 1550 | 220.51 | −42.82 | | | |
| Gas phase | (20) | 1550 | 30.73 | −20.49 | 1425 | 30.73 | −23.90 |
| Main segregation | (22) | | | | 1425 | 849.40 | −34.15 |
| Sulfide melt | (23) | | | | 1425 | 175.98 | 19.22 |
| Heat losses, (Δ) | | | (4.79) | 50.68 | | (4.79) | 102.93 |
| Total product | | | 1060.91 | 114.78 | | 1060.90 | 64.10 |

Feed phases: 1000.00 kg melt phase (16) + 60.91 kg iron sulfide
Product phases I: 353.33 kg segregation (17) + 676.81 kg melt phase (18 + 19) + 30.73 kg gas phase (20)
Product phases II: 854.16 kg segregation (22) +175.98 kg melt phase (23) + 30.73 kg gas phase (20)

| Component Phase Phase No. | | A B | CuO$_{0.5}$ FeO$_{1.5}$ | CuS$_{0.5}$ FeO$_{1.3}$ | Cu SiO$_2$ | PbO CaO | Pb MgO | ZnO AlO$_{1.5}$ | FeS KO$_{0.5}$ | FeO — |
|---|---|---|---|---|---|---|---|---|---|---|
| Feed slag | (16) | A | 16.21 | — | (14.40) | 2.15 | (2.00) | 0.62 | 0.03 | — |
| | | B | 6.41 | — | 33.80 | 15.10 | 10.80 | 10.40 | 4.00 | — |
| Primary segregation | (17) | A | — | — | — | — | — | 1.76 | — | 19.12 |
| | | B | — | — | 36.95 | — | 18.90 | 12.25 | 11.32 | — |
| Melt phase | (18 + 19) | A | 1.08 | 8.19 | 13.78 | — | 2.96 | — | — | — |
| | | B | — | 4.74 | 31.03 | 22.31 | 6.25 | 8.97 | — | — |
| Main segregation | (22) | A | — | — | — | — | — | 0.73 | — | 7.91 |
| | | B | — | 3.76 | 39.87 | 17.63 | 12.64 | 12.18 | 4.68 | — |
| Melt phase | (23) | A | 4.15 | 31.49 | 53.00 | — | 11.36 | — | — | — |

TABLE 6

Sulfidization of fayalite slag phase within the range of the primary crystallization Feed phases: 1000.00 kg melt phase (24) + 35.56 kg iron sulfide (25)
Product phases: 298.56 kg olivine (26) + 721.45 kg melt phase (27), saturation limit FEIJ;
164.20 kg segregation (28) + 557.26 kg melt phase (29), saturation limit IJ;
513.79 kg segregation (30) + 43.46 kg melt phase (31), conjugate melts;
1020.00 kg solid product slag

| Component Phase No. | Analysis, % by weight | | | | | | | | |
|---|---|---|---|---|---|---|---|---|---|
| | Cu | Pb | Zn | Fe | Ni | Co | S | Fe$_3$O$_4$ | SiO$_2$ |
| Feed slag (24) | 1.12 | 0.050 | 2.11 | 40.85 | 0.032 | 0.100 | 0.06 | 22.83 | 31.60 |
| Iron sulfide (25) | — | — | — | 50.45 | — | — | 45.37 | — | 4.15 |
| Segregation (26) | — | — | 4.56 | 34.85 | — | — | — | — | 33.07 |
| Melt phase (27) | 1.56 | 0.069 | 1.04 | 44.49 | 0.044 | 0.139 | 1.51 | 16.24 | 30.11 |
| Segregation (28) | — | 0.291 | 4.22 | 21.75 | 0.098 | 0.540 | — | — | 33.89 |
| Melt phase (29) | 2.02 | 0.004 | 0.35 | 51.10 | 0.029 | 0.022 | 1.96 | 21.02 | 29.00 |
| Segregation (30) | — | — | — | 52.26 | — | — | — | 21.45 | 31.28 |
| Melt phase (31) | 25.84 | 0.047 | 4.53 | 37.39 | 0.375 | 0.282 | 25.11 | 16.01 | 2.00 |
| Product slag (32) | 1.10 | 0.049 | 2.07 | 41.67 | 0.031 | 0.098 | 1.07 | 11.49 | 30.98 |
| Waste slag (33) | 0.36 | 0.049 | 1.94 | — | 0.016 | 0.090 | — | 11.45 | 31.71 |

TABLE 6-continued

Sulfidization of fayalite slag phase within the range of the primary crystallization Feed phases: 1000.00 kg melt phase (24) + 35.56 kg iron sulfide (25)
Product phases: 298.56 kg olivine (26) + 721.45 kg melt phase (27), saturation limit FEIJ;
164.20 kg segregation (28) + 557.26 kg melt phase (29), saturation limit IJ;
513.79 kg segregation (30) + 43.46 kg melt phase (31), conjugate melts;
1020.00 kg solid product slag

| Heat balance. | | Melt phase (24) - saturation surface FEIJ Temperature. Amounts of material and heat | | | Saturation surface - saturation limit IJ Temperature. Amounts of material and heat | | |
|---|---|---|---|---|---|---|---|
| Balance component | | K | kg | Mcal | K | kg | Mcal |
| Feed | | | | | | | |
| Slag phase | (24) | 1600 | 1000.00 | −1669.5 | | | |
| Iron sulfide | (25) | 298 | 35.56 | −12.2 | | | |
| Product | (26 + 27) | | | | 1413 | 1020.00 | −1754.2 |
| Total feed | | | 1035.56 | −1681.7 | | 1020.00 | −1754.2 |
| Product | | | | | | | |
| Segregation | (26) | 1413 | 298.56 | −611.4 | 1368 | 298.56 | −613.8 |
| Segregation | (28) | | | | 1368 | 164.20 | −387.3 |
| Melt phase | (27) | 1413 | 721.45 | −1142.8 | | | |
| Melt phase | (29) | | | | 1368 | 557.26 | −773.3 |
| Gas phase | | 1413 | 15.55 | −13.5 | | | |
| Heat loss | | | | +86.0 | | | +20.2 |
| Total product | | 1413 | 1035.56 | −1681.7 | 1368 | 1020.00 | −1754.2 |

What is claimed is:

1. Sulfidizing pre-treatment of slag from pyrometallurgical processes, comprising stacking in alternate layers solid sulfur-bearing reductant and molten slag having a temperature so low that crystals are formed upon or soon after contact with the reductant, but at the same time so high that it suffices for melting the reductant between the slag layers; and allowing the slag to cool.

2. The process of claim 1 for sulfidizing pre-treatment of fayalite slag, in which finely-divided pyrite and the slag are stacked in alternate layers, the temperature of the slag being about 1150°–1250° C.

3. The process of claim 1 for pre-treatment of slag which contains earth-alkali silicate and aluminum oxide, in which finely-divided pyrite and the slag are stacked in alternate layers, the temperature of the slag being about 1350°–1500° C.

4. The process of claim 1, in which the sulfur-bearing reductant is added at a rate of 35–61 kg per one tonne of slag.

5. The process of claim 1, in which the sulfur-bearing reductant is at least one reductant selected from the group comprising pyrite, pyrrhotite, earth-alkali sulfate, and coke.

* * * * *

UNITED STATES PATENT AND TRADEMARK OFFICE
CERTIFICATE OF CORRECTION

PATENT NO. : 4,304,596

DATED : December 8, 1981

INVENTOR(S) : Simo A.I. Makipirtti et al

It is certified that error appears in the above-identified patent and that said Letters Patent are hereby corrected as shown below:

Column 8, line 11:

"$E=122x\tau$" should read --$E=122x\pi$--.

line 17:

"$d=10^{-5}cm)$" should read --$(d=10^{-5}cm)$--.

line 29:

"$A=2.43x10^{-1}x\tau$" should read --$A=2.43x10^{-1}x\pi$--.

Column 9, line 25:

"it can be observed" should read --It can be observed--.

line 58:

"$°8,°9,°10,°12)$" should read --$(°8,°9,°10,°12)$--.

Column 11, 2nd line of Table:

"$FeS_2(s)-FeS(s)+2(g)$" should read --$FeS_2(s)-FeS(s)+1/2\ S_2(g)$

Column 19, line 55:

"$-10<2(cu)]^{-1}$" should read ---$10^{-2}(cu)]^{-1}$--.

Signed and Sealed this

Sixth Day of April 1982

|SEAL|

Attest:

Attesting Officer

GERALD J. MOSSINGHOFF

Commissioner of Patents and Trademarks